United States Patent

Kakumu et al.

[11] Patent Number: 5,909,757
[45] Date of Patent: Jun. 8, 1999

[54] PNEUMATIC TIRE WITH RADIALLY INNER AND RADIALLY OUTER BEAD CORE

[75] Inventors: Kiichiro Kakumu, Kobe; Masatoshi Tanaka, Takarazuka, both of Japan

[73] Assignee: Sumitomo Rubber Industries, Ltd., Hyogo-ken, Japan

[21] Appl. No.: 08/733,962

[22] Filed: Oct. 23, 1996

[30] Foreign Application Priority Data

Oct. 23, 1995 [JP] Japan .................................... 7-274398
Nov. 28, 1995 [JP] Japan .................................... 7-309161
Sep. 18, 1996 [JP] Japan .................................... 8-246288

[51] Int. Cl.$^6$ .............................. B60C 3/06; B60C 9/04; B60C 15/00; B60C 15/05; B60C 15/06
[52] U.S. Cl. ........................ 152/543; 152/455; 152/456; 152/545; 152/552; 152/556
[58] Field of Search .............................. 245/1.5; 152/545, 152/540, 539, 543, 547, 556, 557, 551, 552, 548, 455, 456

[56] References Cited

U.S. PATENT DOCUMENTS

| 2,480,811 | 8/1949 | McCoy | 152/545 X |
| 4,700,765 | 10/1987 | Masclaux | 152/545 |
| 5,513,686 | 5/1996 | Diernaz | 152/540 |

FOREIGN PATENT DOCUMENTS

| 0168754 | 1/1986 | European Pat. Off. . | |
| 0634297 | 1/1995 | European Pat. Off. . | |
| 2433425 | 3/1980 | France . | |
| 51-50105 | 5/1976 | Japan | 152/545 |
| 3169726 | 7/1991 | Japan | 152/539 |
| 3243404 | 10/1991 | Japan | 152/545 |
| 2041077 | 8/1995 | Russian Federation | 152/545 |
| 1696323 | 12/1991 | U.S.S.R. | 152/540 |
| 9201577 | 2/1992 | WIPO . | |

*Primary Examiner*—Adrienne Johnstone

[57] ABSTRACT

A pneumatic tire comprises a radially inner bead core disposed in at least one of the bead portions, a radially outer bead core disposed radially outside the inner bead core, a buffer rubber layer disposed between the radially inner bead core and radially outer bead core to provide a predetermined space therebetween, and a toroidal carcass extending between the bead portions through the tread portion and sidewall portions, wherein the carcass comprises a ply of cords turned up around the radially outer bead core to be secured thereto, passing between the radially outer bead core and the buffer rubber layer, so that a radially outward tension of the carcass caused by tire inflation acts less on the radially inner bead core than the radially outer bead core.

13 Claims, 6 Drawing Sheets

Fig. 8
CONVENTIONAL
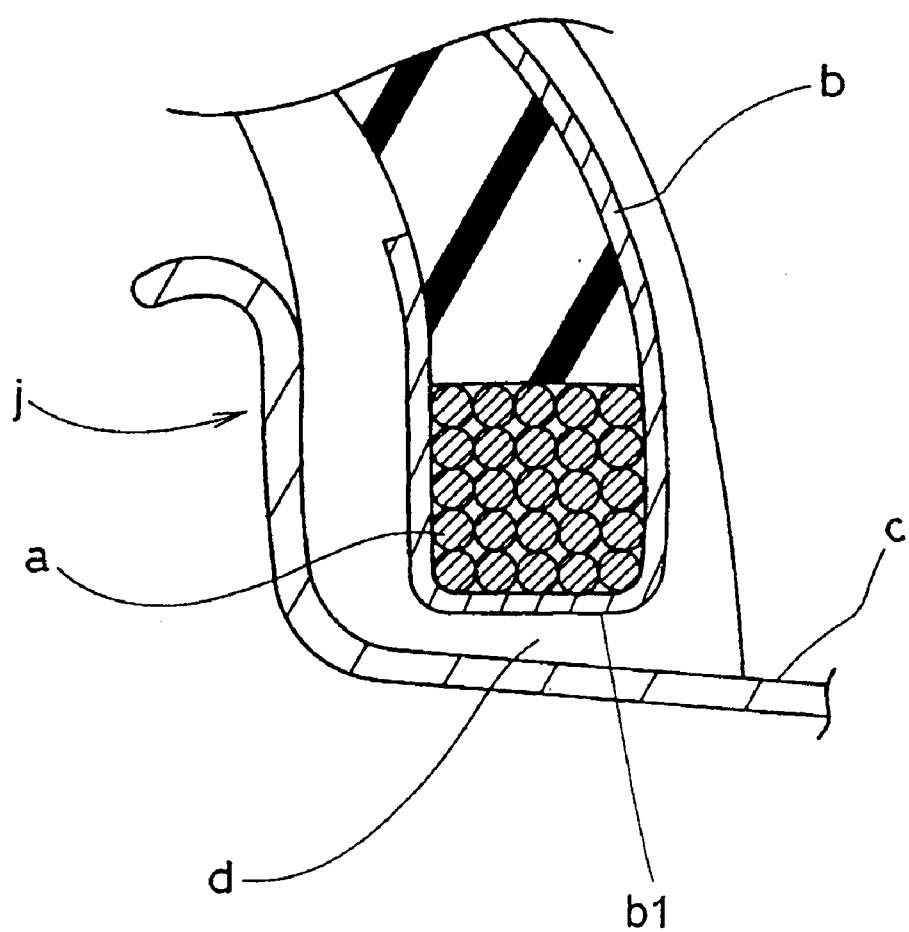

PNEUMATIC TIRE WITH RADIALLY INNER AND RADIALLY OUTER BEAD CORE

BACKGROUND OF THE INVENTION

The present invention relates to a pneumatic tire with reduced road noise.

Road noise is a uncomfortable rumbling sound which may be heard inside of a vehicle when running on relatively rough road surfaces. Such rough road surfaces vibrate the tread portion of the tire, and this vibration is transmitted to the wheel rim, axis, suspension and body of the vehicle and then heard inside of the vehicle as road noise.

In general, as shown in FIG. 8, a pneumatic tire is provided in each bead portion with a bead core (a), and a carcass (b) is secured to the bead core (a) by wrapping the core therein. When the tire is mounted on a rim (j), the thin rubber layer (d) which exists between the carcass portion (b1) under the bead core (a) and the bead seat of the rim is compressed, and tensile strain acts on the carcass. Therefore, with respect to vibration, the tire is provided from the tread portion to the bead portion with a good channel for transmitting vibration.

In such a tire, it is very effective for reducing road noise to interfer with the transmission of vibration in the tread portion (where vibration is introduced), in other words at the boundary between the tire and road surface.

It has been therefore, proposed to use a soft tread rubber composition which is excellent at absorbing vibration and/or to increase the tread rubber thickness. However, in these methods, other running performances tend to deteriorate. For example, in the former method the wear resistance of the tread greatly decreases. In another method of obstructing vibration, it has been proposed to provide a rubber composition, which is excellent in vibration absorption, along the outer surface of the bead portion of the tire which which contacts with the rim flange. However, this method is insufficient for reducing the road noise effect. This method obstructs the transmission of vibration at the boundary between the tire and rim (the exit for the vibration). In this regard, this method is the same as the former method.

SUMMARY OF THE INVENTION

It is therefore, an object of the present invention to provide a pneumatic tire in which, by improving tire reinforcing members such as the carcass bead core and the like, disposed inside the tire, the transmission of vibration from the tread portion to the bead portion is effectively decreased to reduce road noise.

According to one aspect of the present invention, a pneumatic tire comprises a tread portion, a pair of sidewall portions, a pair of bead portions, a radially inner bead core disposed in at least one of the bead portions, a radially outer bead core disposed radially outside the inner bead core, a buffer rubber layer disposed between the radially inner bead core and the radially outer bead core to provide a predetermined space therebetween, and a toroidal carcass extending between the bead portions through the tread portion and sidewall portion.

The carcass comprises a ply of cords turned up around the radially outer bead core to be secured thereto and passing between the radially outer bead core and the buffer rubber layer, so that a radially outward tension of the carcass caused by tire inflation acts less on the radially inner bead core than the radially outer bead core.

The thickness of the buffer rubber layer measured in the tire radial direction is preferably in the range of from 2 to 6 mm.

Accordingly, the radially outer bead core functions as an anchor for the carcass. On the contrary, the radially inner bead core functions mainly to fasten the bead portion on the bead seat of a rim. Therefore, the radially inner and outer bead cores do not compress the buffer rubber layer in the tire radial direction. As a result the buffer rubber layer functions as an ideal vibration isolater. Thus, the vibration which is mainly transmitted by the carcass is stopped at the outer bead core, and the transmission from the outer bead core to the inner bead core is hindered.

BRIEF DESCRIPTION OF THE DRAWINGS

Embodiments of the present invention will now be described in detail in conjunction with the accompanying drawings, in which:

FIG. 8 is a cross sectional view showing a conventional bead structure.

DETAILED DESCRIPTION OF THE INVENTION

Figure 1:
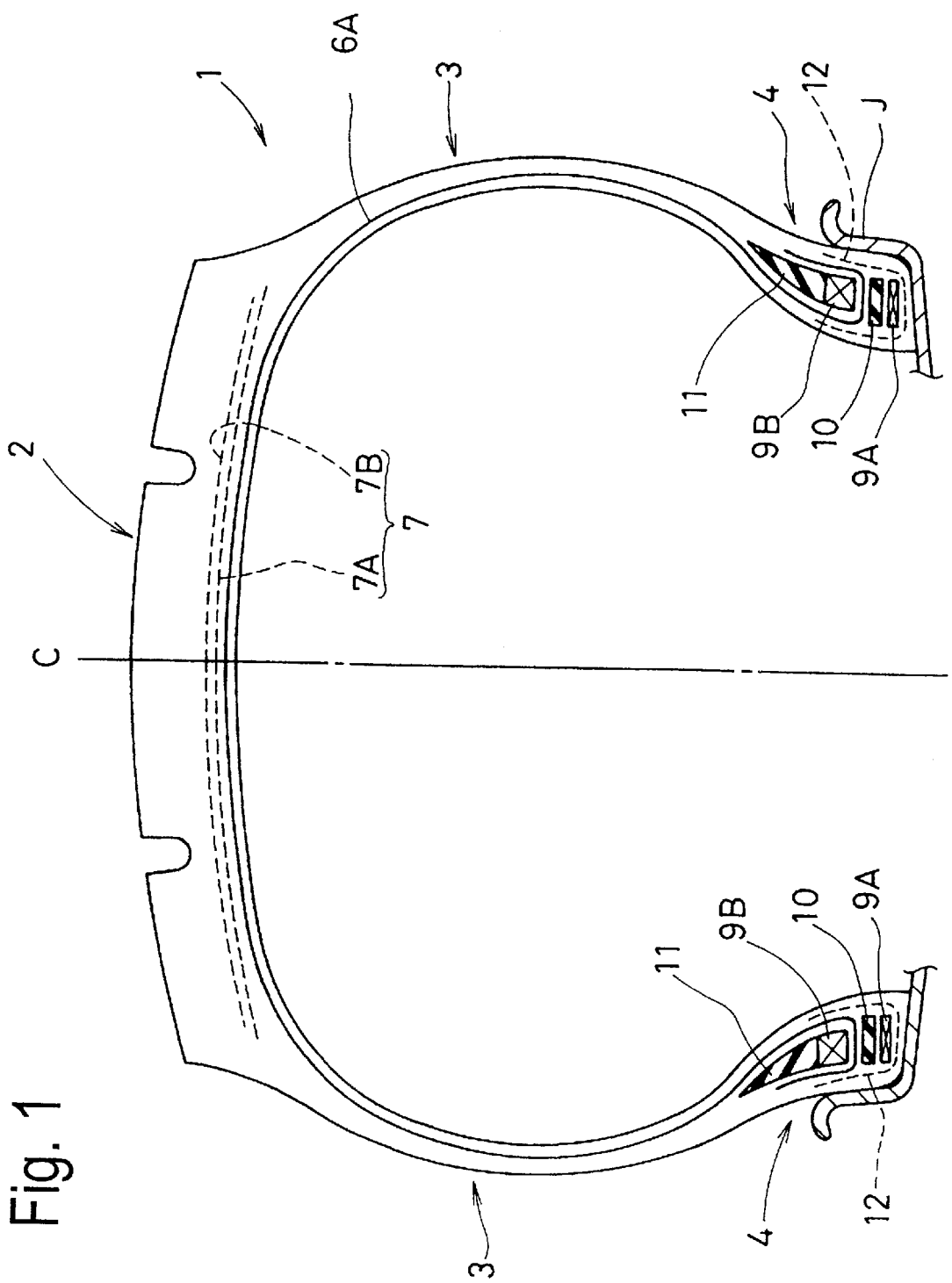
FIG. 1 is a cross sectional view of a tire showing an embodiment of the present invention.

In FIG. 1, the pneumatic tire 1 comprises a tread portion 2, a pair of axially spaced bead portions 4, a pair of sidewall portions 3 extending between the tread edges and the bead portions, a carcass comprising a carcass ply 6A extending between the bead portions 4 through the tread portion 2 and the sidewall portions 3, and a stiff belt 7 disposed radially outside the carcass ply 6A and inside the tread portion 2 to provide a hoop effect on the carcass ply 6A.

The tire in this embodiment is a passenger radial tire whose aspect ratio is 0.65.

The carcass in this embodiment consists of only one ply 6A. The carcass ply 6A is made of carcass cords arranged radially at an angle of from 65 to 90 degrees, in this embodiment 90 degrees with respect to the tire equator C. For the carcass cords, organic fiber cords, e.g. nylon, rayon, polyester and the like are preferably used, but steel cords can be also used.

The belt 7 comprises at least one ply of belt cords. In this embodiment, the belt 7 comprises a radially inner ply 7A and a radially outer ply 7B.

The belt cords in each ply 7A and 7B are laid at an angle of from 10 to 35 degrees withrespect to the tire equator C in parallel with each other but crosswise to the cords of the adjacent ply.

For the belt cords in this embodiment, metal (steel) cords are used, but relatively high elastic organic fiber cords such as rayon and the like may be used.

In each of the bead portions 4, a radially inner first bead core 9A and a radially outer second bead core 9B are disposed. The second bead core 9B is disposed radially outside of and concentric with the first bead core 9A.

The first bead core 9A is to ensure the engagement between the tire and rim. Thus, the diameter and position thereof are so defined. The first bead core 9A is disposed within a range which corresponds to the height H of a flange of a standard rim J for the tire.

The above-mentioned carcass ply 6A is turned up around the second bead core 9B in each of the bead portions from the axially inside to axially outside of the tire to be secured thereto. In this case where a single carcass ply is used, it is preferable that the radially outer surface of the second bead core 9B is not higher than the height H of the flange of the rim J.

In this embodiment, the first bead core 9A and the second bead core 9B are substantially aligned in the tire axial direction.

Figure 2:
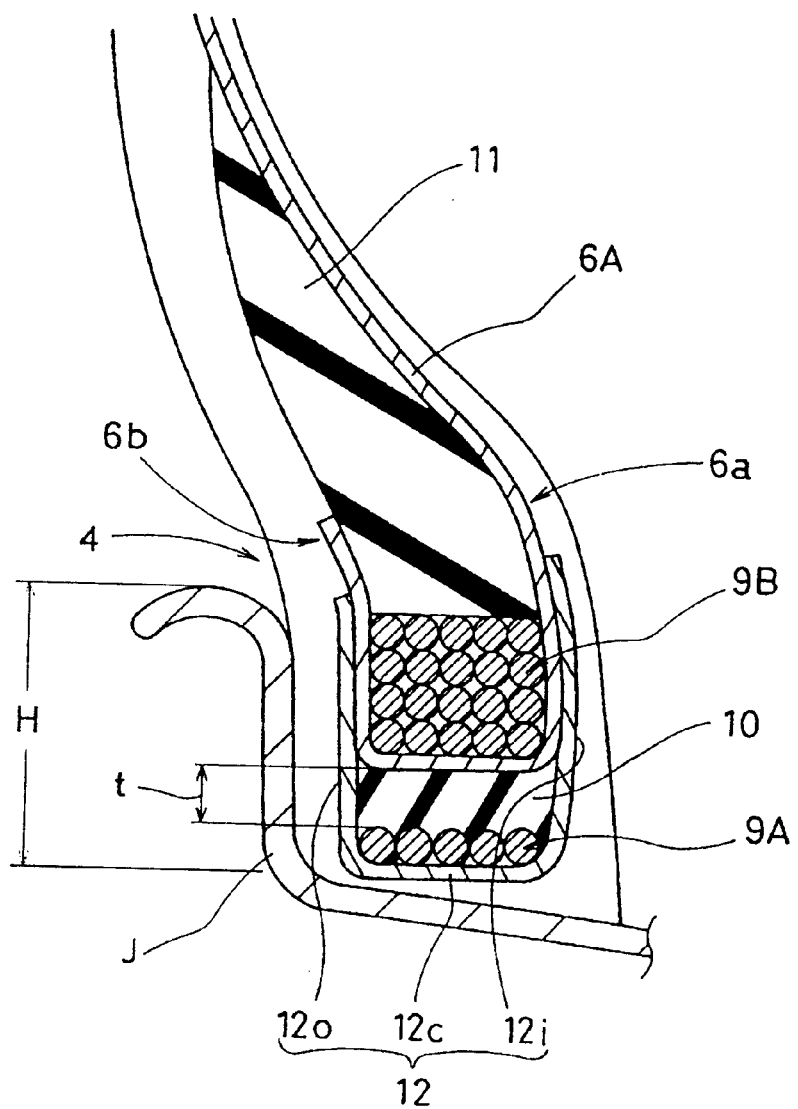
FIG. 2 is an enlarged cross sectional view of the bead portion thereof.

It was confirmed that, for a tire size of 185/65R14 which is the size of this embodiment, a sufficient tire/rim engaging force can be obtained with the first bead core 9A which is a 1×5 type bead core, that is, five spiral turns of a 1.20 mm dia. bead wire as shown in FIG. 2. It is however, necessary to set the cross sectional area of the second bead core 9B larger than that of the first bead core 9A in order to withstand the cord tension of the carcass ply 6A when the tire is inflated. In this embodiment, the second bead core 9B is a 4×5 type bead core, that is, four plies of five spiral turns of a bead wire. The sectional shape thereof is generally a rectangle. Accordingly, the ratio (S2/S1) of the cross sectional area S2 of the second bead core 9B to the cross sectional area S1 of the first bead core 9A becomes about 4.

The diameter of the bead wire of the first bead core is the same as that of the second bead core. However, the diameters can be differed.

In the first and second bead cores 9A and 9B, the wound bead wire can be wrapped by a sheet of rubber or a sheet of rubberized cords.

Between the first bead core 9A and the second bead core 9B, a buffer rubber layer 10 is disposed.

The carcass ply 6A is secured to the second bead core 9B with the carcass cords extending through between the radially inner surface of the second bead core 9B and the buffer rubber layer 10. Accordingly, the second bead core 9B is pulled radially outward when the tire is inflated. Therefore, the buffer rubber layer 10 radially outside the first bead core 9A is not subjected to a large compressive force, whereas the rubber located radially inside the first bead core 9A is subjected to a large compressive force. Accordingly, the buffer rubber layer 10 is able to absorb the vibration of the carcass ply 6A. As a result, the road noise can be greatly reduced.

Figure 3:
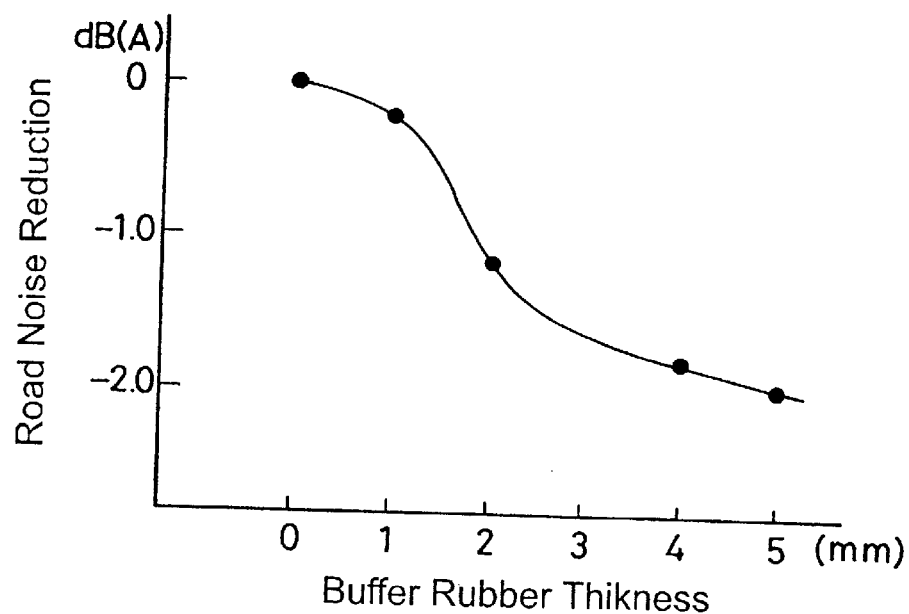
FIG. 3 is a graph showing a relationship between the thickness of the buffer rubber layer and road noise reduction.

The thickness (t) of the buffer rubber layer 10 measured in the radial direction in a tire meridian section, that is, the distance between the first bead core 9A and the carcass ply 6A, is preferably set in the range of from 2 mm to 6 mm. This is based on test results which are summarized in FIG. 3 in which the reduction in the overall road noise was measured by changing the thickness (t). From the test, it was confirmed that a remarkable reduction of more than 1 dB(A) can be obtained when the thickness (t) exceeds 2 mm. But, when the thickness (t) exceeds 6 mm, no real effect on reducing the road noise can be obtained. Thus, the thickness (t) of the buffer rubber layer 10 is set in the range of from 2 to 6 mm, more preferably 2 to 5 mm, still more preferably 4 to 5 mm. In case of 185/65 tire size, the thickness (t) is set in the range of 2 to 4 mm.

Figure 4:
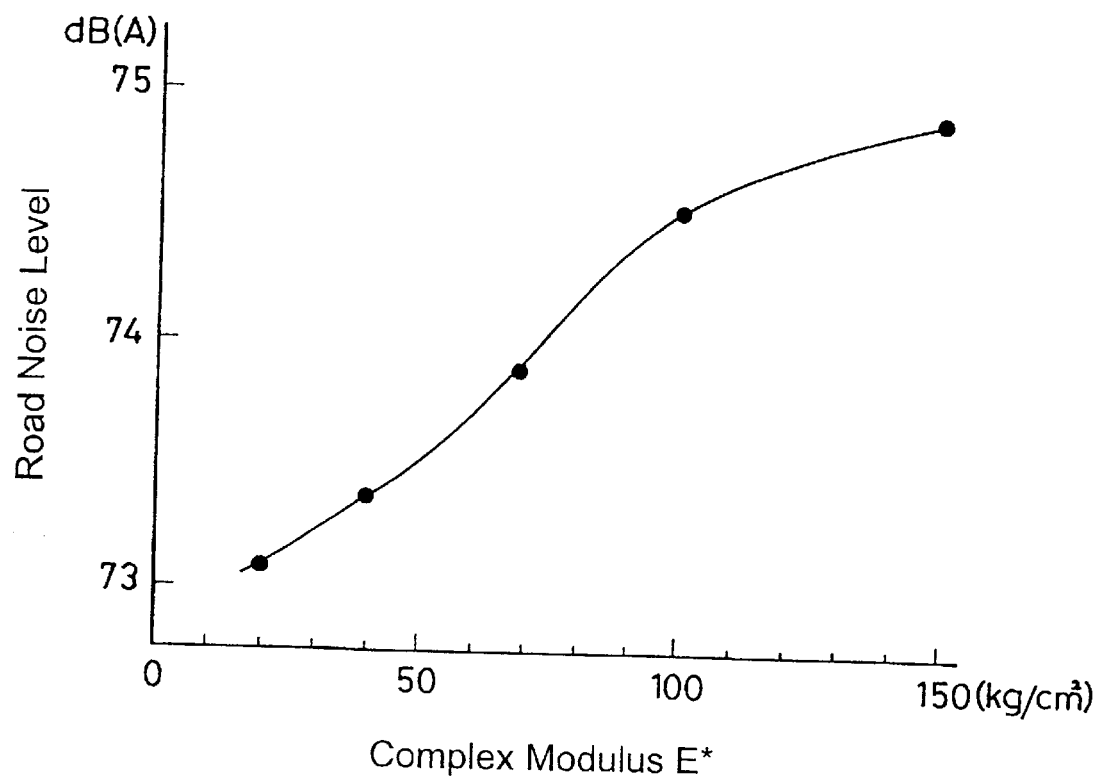
FIG. 4 is a graph showing a relationship between the complex elastic modulus of the buffer rubber layer and road noise level.

The buffer rubber layer 10 is preferably made of a rubber composition having a complex elastic modulus E* of from 20 to 100 kgf/sq.cm, more preferably 20 to 70 kgf/sq.cm, still more preferably 20 to 40 kgf/sq.cm. This is based on the results of a test shown in FIG. 4 in which the road noise level was measured by changing the complex elastic modulus E* of the buffer rubber layer while maintaining the thickness (t) at a constant value of 2 mm. When the complex elastic modulus E* is less than 20 kgf/sq.cm, the rigidity of the layer excessively decreases, and the stability is liable to decrease when the tire is mounted on a rim. When more than 100 kgf/sq.cm, the rigidity of the bead portion 4 excessively increases and the layer becomes more susceptible to transmitting vibration.

In the above-mentioned tests, the road noise was measured such that a 1800 cc FF passenger car provided on all the wheels with test tires of size 185/65R14 was run on a dry rough asphalt road at a speed of 60 km/hr, and the overall noise level was measured using a microphone set near the outside ear of the driver.

Here, the above-mentioned complex elastic modulus E* is measured with a viscoelastic spectrometer made by Iwamoto Seisakusyo. The conditions are as follows.

Size of specimen: 4 mm width×30 mm length×1.5 mm thickness

Temperature: 70 degrees C.

Frequency: 10 Hz

Dynamic deformation: +−2%

Further, it is preferable that the JIS(A) hardness of the buffer rubber layer 10 at 20 degrees C. is set in the range of from 65 to 80 degrees. When the JIS(A) hardness of the buffer rubber layer 10 is less than 65 degrees, there is a tendency for the bead portion 4 to lack rigidity. When the hardness is more than 80 degrees, the buffer rubber layer 10 can not fully absorb the vibration, and thus the effect on reducing the road noise decreases.

Each of the bead portions 4 is further provided with a bead apex 11 extending and tapering radially outward from the radially outside of the second bead core 9B. The bead apex 11 is made of a hard rubber having a JIS(A) hardness of from 65 to 95 degrees.

Furthermore, each of the bead portions 4 is provided with a bead reinforcing layer 12 composed of a ply of organic fiber cords, e.g. nylon, rayon, polyester and the like embedded in rubber in parallel formation. As shown in FIG. 2, the reinforcing cord layer 12 is composed of a base portion 12c, an axially inner portion 12i and an axially outer portion 12o, and it has a U-shaped cross section. The base portion 12c extends along the radially inside of the first bead core 9A. The axially inner portion 12i extends radially outward from the axially inner end of the base portion 12c along the axially inside of the first bead core 9A and reaches to the axially inside of the second bead core 9B. The axially outer portion 12o extends radially outward from the axially outer end of the base portion 12c along the axially outside of the first bead core 9A and reaches to the axially outside of the second bead core 9B.

It is preferable that each axial portion 12i, 12o terminates at a position radially outward of the radially outermost end of the second bead core 9B. Thus, the inner portion 12i and outer portion 12o partially cover the axially inner surface of the carcass ply main portion 6a and the axially outer surface of the carcass ply turned up portion 6b, respectively. As a result, the separated first and second bead cores 9A and 9B are bound with each other and provided with unity in the tire axial direction. Therefore, the bead portion 4 is improved in rigidity in the tire axial direction.

The organic fiber cords of the reinforcing cord layer 12 are laid at angle of from 0 to 70 degrees with respect to the radially direction. In view of reinforcement of the bead portion, a 0 to 50 degrees range is more preferable.

As modifications of this embodiment, the number of the bead wire, the number of ply and the number of turns in each ply, in the first and second bead cores 9A and 9B and the section shape thereof can be changed. Further, the number of the carcass ply turned up around the second bead core 9B can be increased to two for example. Furthermore, the direction of turnup can be reversed.

A further embodiment of the present invention will now be described, wherein the same structure or elements as mentioned hereinabove are assigned the same reference numerals and accordingly descriptions are not repeated.

Figure 5:
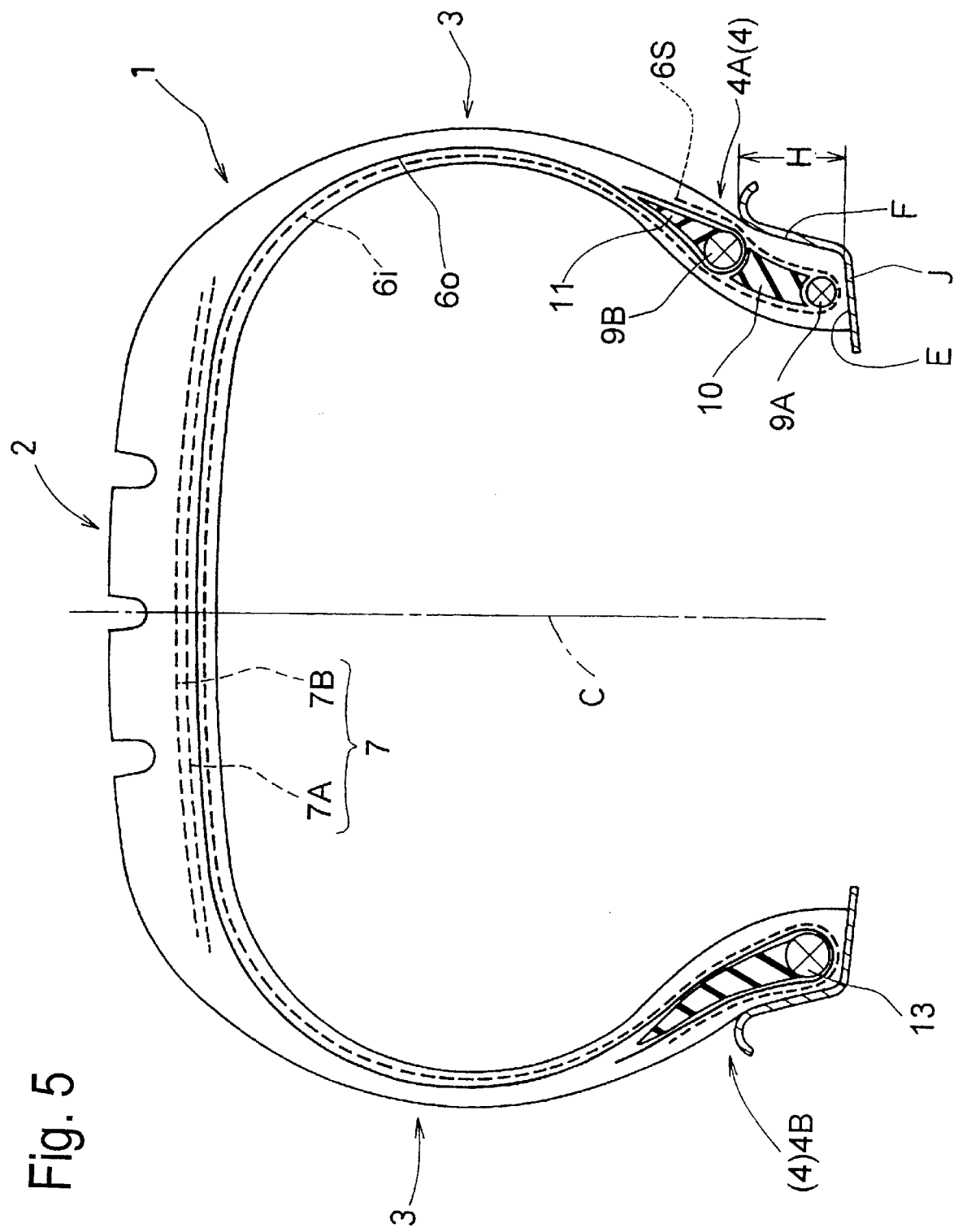
FIG. 5 is a cross sectional view of a tire showing another embodiment of the present invention.

In this embodiment, as shown in FIG. 5, a plurality of carcass plies, in this example two plies 6i and 6o are provided which extend between the bead portions 4 (4A and 4B).

In one bead portion 4A, the innermost carcass ply 6i is turned up around the first beadcore 9A from the axially inside to outside of the tire to be secured thereto, while the outermost carcass ply 6o is turned up around the second bead core 9B from axially inside to outside of the tire to be secured thereto.

Each carcass ply 6i, 6o is made of organic fiber cords arranged radially at an angle of from 65 to 90 degrees with respect to the tire equator C. In this embodiment, the angles are set at nearly 90 degrees so that the plies slightly cross each other.

The radially outer end 6S of the turnup portion of the innermost carcass ply 6i is positioned radially outward of the radially outermost end of the second bead core 9B to obtain a similar effect to the above-mentioned reinforcing cord layer 12, that is, an axial unity of the first and second bead cores 9A and 9B.

With respect to the modulus of carcass ply cord at 5% elongation, the outermost carcass ply 6o is set higher than the innermost carcass ply 6i to effectively reinforce the tire main body and relatively decrease the vibration transmission rate of the innermost carcass ply 6i.

The ratio (M1/M2) of the modulus M1 at 5% elongation of the outermost carcass ply 6o cords to the modulus M2 at 5% elongation of the innermost carcass ply 6i cords is preferably set in the range of from 1.2 to 3.0. If the ratio (M1/M2) is less than 1.2, the road noise reducing effect decreases. If the ratio (M1/M2) is more than 3.0, the tire uniformity is liable to deteriorate. The reason why the modulus at 5% elongation is used is that the actual elongation of the carcass cord under normal service conditions is about 5%.

In general, as the cord tension of a carcass ply increases, the vibration transmission rate and natural frequency of the carcass ply increase, and the road noise also increases. The larger the cord modulus, the larger the cord tension. Therefore, when the tire is inflated, the cord tension of the higher modulus cord ply becomes larger and vibration is transmitted easier than the lower modulus cord ply.

In this embodiment, therefore, the outer ply 6o is secured to the outer bead core and the inner ply 6i is secured to the inner bead core. Accordingly, the vibration decreases between the outer and inner bead cores.

As the innermost carcass ply 6i is secured to the first bead core 9A, the ratio (S2/S1) of the cross sectional area S2 of the second bead core 9B to the cross sectional area S1 of the first bead core 9A is set to be less than that in the above-mentioned first embodiment, and usually set in the range of from 1.2 to 3.0.

On the contrary, the other bead portion 4B is provided with a single bead core 13 as shown in FIG. 5. The bead core 13 is disposed at a radial height corresponding to that of the first bead core 9A, and the cross sectional area thereof is set to be larger than that of the second bead core 9B so as to keep the rigidity balance between the right and left bead portions 4A and 4B. In the bead portion 4B, therefore, the inner and outer carcass plies 6i and 6o are turned up around the bead core 13 from the axially inside to outside of the tire to be secured thereto.

In the bead cores 9A, 9B and 13 in this embodiment, a round sectional shape is used. It is however, possible to use other shapes.

Figure 6:
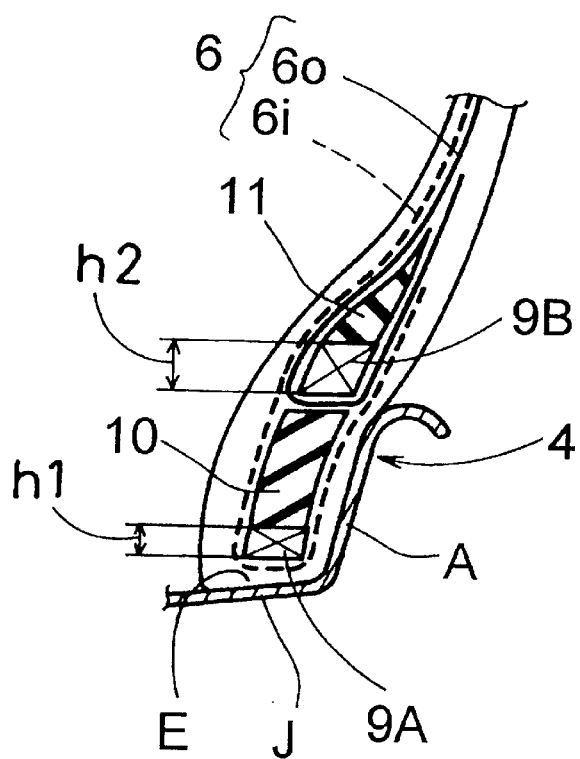
FIG. 6 is a partial cross sectional view showing another embodiment.

FIG. 6 shows a modification of the double core bead portion 4A, wherein the first and second bead cores 9A and 9B have rectangular sectional shapes with different radial heights h1 and h2, and the second bead core 9B is disposed such that the radially inside thereof is located at the substantially same height of the radially outer edge of the rim flange F.

Figure 7:
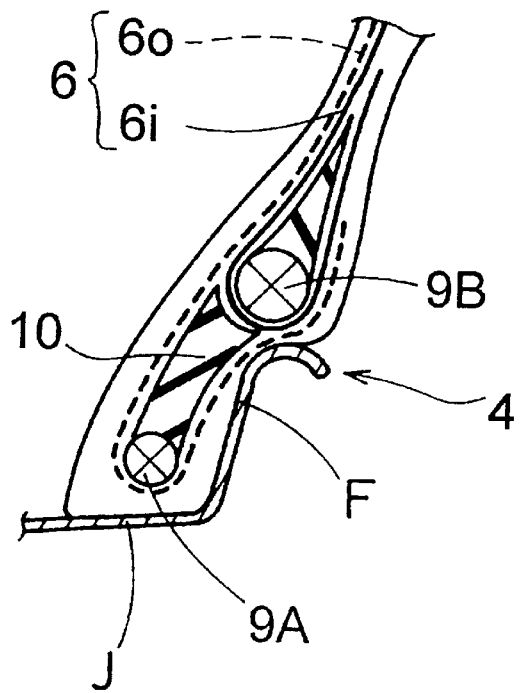
FIG. 7 is a partial cross sectional view showing another embodiment.

FIG. 7 also shows a modification of the double core bead portion 4A, wherein the second bead core 9B overhangs the rim flange F, which is effective on preventing the tire dislocation from the rim.

As further modifications of the second embodiment, it is possible to dispose at least one ply between the inner and outer plies, which is turned up around one of the bead cores 9A and 9B or not turned up. Further, it is possible to employ the double bead core structure of the bead portion 4A in the other bead portion 4B so that the tire has a symmetrical structure.

Incidentally, the asymmetrical tire shown in FIG. 5 is preferably installed such that the double core bead portion 4A is located on the outside of the car, and accordingly the single core bead portion 4B is located on the inside of the car.

COMPARISON TESTS

I. First Embodiment

Test tires of size 185/65R14 were made by way of test and the road noise was measured. The test tires included Ex. tires 1 to 10 having the structure shown in FIGS. 1 and 2 and Ref. tire 1 having the conventional structure shown in FIG. 8. A 1800 cc FF passenger car provided on all the wheels with test tires was run in a test course at a constant speed of 60 km/hr, and the overall noise level in dB(A) was measured as the road noise with a microphone set near the driver's ears. The specifications thereof and test results are shown in Table 1.

In the test, it was confirmed that Example tires were greatly improved in the road noise in comparison with Reference tire. The road noise reduction becomes less when the thickness of the buffer rubber layer is less than 2 mm (Embodiment 9), or the complex elastic modulus thereof is more than 100 kgf/sq.cm (Embodiment 10).

II. Second Embodiment

Test tire of size 185/70R14 88S were made by way of test and the road noise and resistance to bead unseating were measured. The test tire included Ex. tire 11 to 16 having the tire structure shown in FIGS. 5 and 6 and Ref. tire 2 having the conventional tire structure shown in FIG. 8.

In the bead unseating test, mounting the test tire on a standard rim, and applying a force to one of the bead portions from the outside of the tire, the force at which unseating of the bead portion from the rim occurred was measured.

The results are indicated by an index based on that Ref. 2 is 100. The larger the value, the higher the resistance. The tire specifications and test results are shown in Table 2.

From the test, it was confirmed that Example tires 11 to 16 were decreased in the road noise in comparison with Reference tire 2. In comparison with Example tire 6 of which inner and outer carcass plies were made of cords having the same modulus at 5% elongation, other Example tires made of different modulus cords were more improved in the road noise. The road noise was further improved by decreasing the hardness of the buffer rubber layer (Example tires 12 and 13) and/or increasing the modulus ratio (M1/M2) (Example tires 13 and 14).

As described above, in the pneumatic tires according to the present invention, the transmission of carcass vibration to the radially inner bead core is effectively decreased, as a result the road noise can be greatly reduced.

The invention being thus described, it will be obvious that the same may be varied as a departure from the spirit and scope of the invention, and all such modifications as would be obvious to one skilled in the art are intended to be included within the scope of the following claims.

TABLE 1

| Tire | Ex. 1 | Ex. 2 | Ex. 3 | Ex. 4 | Ex. 5 | Ex. 6 | Ex. 7 | Ex. 8 | Ex. 9 | Ex. 10 | Ref. 1 |
|---|---|---|---|---|---|---|---|---|---|---|---|
| Bead structure | FIG. 2 | FIG. 2 | FIG. 2 | FIG. 2 | FIG. 2 | FIG. 2 | FIG. 2 | FIG. 2 | FIG. 2 | FIG. 2 | FIG. 8 |
| First bead core | | | | | | | | | | | non |
| Wire dia. (mm) | 1.20 | 1.20 | 1.20 | 1.20 | 1.20 | 1.20 | 1.20 | 1.20 | 1.20 | 1.20 | — |
| Structure | 1 × 5 | 1 × 5 | 1 × 5 | 1 × 5 | 1 × 5 | 1 × 5 | 1 × 5 | 1 × 5 | 1 × 5 | 1 × 5 | — |
| Second bead core | | | | | | | | | | | |
| Wire dia. (mm) | 0.96 | 0.96 | 0.96 | 0.96 | 0.96 | 0.96 | 0.96 | 0.96 | 0.96 | 0.96 | 0.96 |
| Structure | 4 × 5 | 4 × 5 | 4 × 5 | 4 × 5 | 4 × 5 | 4 × 5 | 4 × 5 | 4 × 5 | 4 × 5 | 4 × 5 | 5 × 5 |
| Buffer rubber layer | | | | | | | | | | | non |
| Thickness (t) (mm) | 2 | 2 | 2 | 2 | 4 | 5 | 4 | 4 | 1 | 2 | — |
| E* (kgf/sq. cm) | 20 | 40 | 70 | 100 | 70 | 70 | 20 | 100 | 70 | 150 | — |
| Bead reinforcing layer | exist | exist | exist | exist | exist | exist | exist | exist | exist | exist | — |
| Road noise dB(A) | 73.1 | 73.4 | 73.9 | 74.5 | 73.3 | 73.1 | 72.5 | 73.8 | 74.8 | 74.9 | 75.1 |

TABLE 2

| Tire | Ex. 11 | Ex. 12 | Ex. 13 | Ex. 14 | Ex. 15 | Ex. 16 | Ref. 2 |
|---|---|---|---|---|---|---|---|
| Carcass | | | | | | | |
| Outer ply cord *1) | A | A | A | A | A | A | A |
| Inner ply cord *1) | B | B | B | C | C | A | A |
| Modulus ratio (M1/M2) | 1.50 | 1.50 | 1.50 | 2.41 | 2.41 | 1.0 | 1.0 |
| Bead portion | FIG. 5 | FIG. 5 | FIG. 5 | FIG. 5 | FIG. 7 | FIG. 5 | FIG. 8 |
| Buffer rubber layer JIS-A hardness | 90 | 80 | 70 | 70 | 70 | 70 | — |
| Road noise dB(A) | 68.7 | 68.5 | 68.3 | 68.0 | 68.2 | 68.9 | 69.1 |
| Bead unseating (index) | 105 | 102 | 101 | 101 | 110 | 101 | 100 |

*1) All the carcass plies were the same cord count. (35/5 cm)
Cord A: polyester cord, 5% modulus 6.75 kgf
Cord B: polyester cord, 5% modulus 4.5 kgf
Cord C: nylon 6-6 cord, 5% modulus 2.8 kgf

We claim:

1. A pneumatic tire comprising:

a tread portion, a pair of sidewall portions, a pair of bead portions, a radially inner bead core disposed in at least one of the bead portions, a radially outer bead core disposed radially outside the inner bead core, a buffer rubber layer disposed between the radially inner bead core and radially outer bead core to provide a predetermined space therebetween, said buffer rubber layer having a complex elastic modulus E* in the range of 20 to 100 kgf/sq.cm. and a toroidal carcass extending between the bead portions through the tread portion and sidewall portions, the carcass comprising a ply of cords turned up around the radially outer bead core to be secured thereto, passing between the radially outer bead core and the buffer rubber layer, so that radially outward tension of the carcass caused by tire inflation acts less on the radially inner bead core than the radially outer bead core.

2. The pneumatic tire according to claim 1, wherein the thickness of the buffer rubber layer measured in the radial direction of the tire is in the range of from 2 to 6 mm.

3. The pneumatic tire according to claim 2, wherein said carcass further comprises an inner ply of cords disposed inside said ply and turned up around the radially inner bead core.

4. The pneumatic tire according to claim 3, wherein the outer carcass ply is higher in cord modulus at 5% elongation than the inner carcass ply.

5. The pneumatic tire according to claim 4, wherein the ratio between the cord modulus M1 at 5% elongation of the outer carcass ply and the cord modulus M2 at 5% elongation of the inner carcass ply is in the range of 1.2 to 3.0.

6. The pneumatic tire according to claim 1, wherein said at least one of the bead portions is provided with a bead apex made of a hard rubber tapering radially outwardly from the radially outside of the radially outer bead core, and a reinforcing layer made of rubberized organic fiber cords, the reinforcing layer composed of a base portion located radially inside of the inner bead core, an axially inner portion extending radially outwardly from the axially inner end of the base portion, and an axially outer portion extending radially outwardly from the axially outer end of the base portion, wherein each of the axially inner and outer portions of the reinforcing layer has a radially outer end located radially outside of the radially outer end of the outer bead core so as to extend along the axially inner and outer surface, respectively, of the carcass ply which is turned up around the outer bead core.

7. The pneumatic tire according to claim 1, wherein the ratio S2/S1 of the cross-sectional area S2 of the outer bead core to the cross-sectional area S1 of the inner bead core is in the range of 1.2 to 3.0.

8. The pneumatic tire according to claim 1, wherein the inner bead core and the outer bead core are disposed such that the radially inside of the outer bead core is located at substantially the same radial height as the radially outer edge of the rim flange on a standard wheel rim for the tire.

9. The pneumatic tire according to claim 1, wherein the inner bead core and the outer bead core are disposed such that the outer bead core is located radially outside the radially outer edge of the rim flange on a standard wheel rim for the tire.

10. The pneumatic tire according to claim 9, wherein the outer bead core is positioned axially outwards of the inner bead core so as to overlay the rim flange on the standard wheel rim for the tire.

11. The pneumatic tire according to claim 1, wherein the buffer rubber layer has a complex elastic modulus E* in the range of 20 to 40 kgf/sq.cm.

12. The pneumatic tire according to claim 1, wherein both bead portions of the tire have the same construction.

13. A pneumatic tire comprising:

a tread portion, a pair of sidewall portions, a pair of bead portions, a radially inner bead core disposed in at least one of the bead portions, a radially outer bead core disposed radially outside the inner bead core, a buffer rubber layer disposed between the radially inner bead core and radially outer bead core to provide a predetermined space therebetween, the thickness of said buffer rubber layer, measured in the radial direction of the tire, being in the range of from 2 to 6 mm, and a toroidal carcass extending between the bead portions through the tread portion and sidewall portions, the carcass comprising a ply of cords turned up around the radially outer bead core to be secured thereto, passing between the radially outer bead core and the buffer rubber layer, so that radially outward tension of the carcass caused by tire inflation acts less on the radially inner bead core than the radially outer bead core.

* * * * *